Nov. 20, 1928.
H. E. MARSH
1,692,676
FLUID PRESSURE BRAKE
Filed Sept. 29, 1926   2 Sheets-Sheet 1
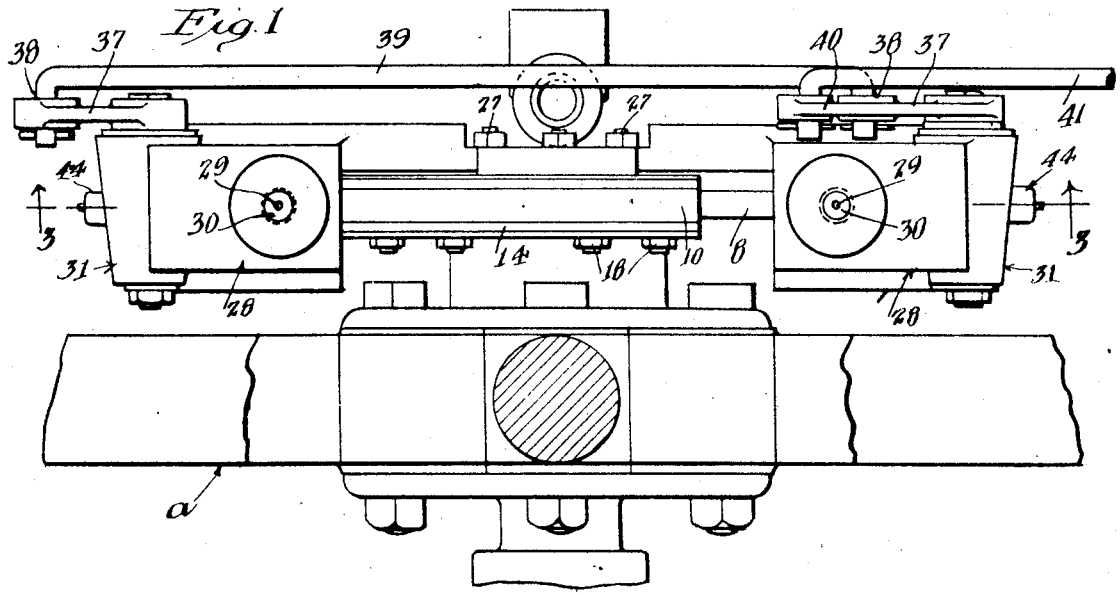
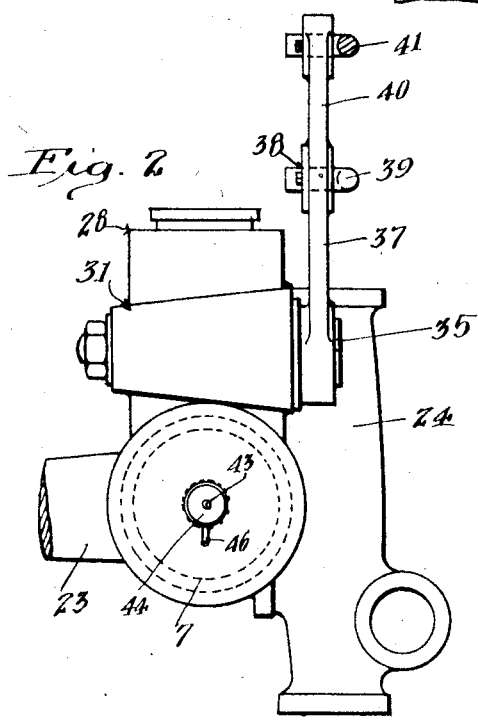
Inventor
Howard E. Marsh
By Lyon & Lyon
Attorneys Nov. 20, 1928.  
H. E. MARSH  
1,692,676

FLUID PRESSURE BRAKE

Filed Sept. 29, 1926  2 Sheets-Sheet 2

Inventor  
Howard E. Marsh  
By Lyon & Lyon  
Attorneys

Patented Nov. 20, 1928.

1,692,676

UNITED STATES PATENT OFFICE.

HOWARD E. MARSH, OF LOMPOC, CALIFORNIA, ASSIGNOR TO J. F. FRICK AND E. J. TALBOTT, TRUSTEES.

FLUID-PRESSURE BRAKE.

Application filed September 29, 1926. Serial No. 138,509.

This invention relates to fluid pressure brakes of the type in which a plunger is driven by the vehicle so as to produce fluid pressure in front of the plunger tending to retard said plunger and thus transmit a braking action upon the vehicle.

An object of the invention is to provide a brake of this character of comparatively simple construction and one that is easy to control.

Another object is to provide a brake of this character that can be employed as an air compressor for creating a supply of compressed air useful, for example, for inflating tires.

A further object is to provide a brake in which atmospheric air is drawn into the brake and compressed therein to effect the braking action.

The accompanying drawings illustrate the invention:

Figure 1 is a plan view of a fluid pressure brake constructed in accordance with the provisions of this invention, the same being mounted upon a vehicle wheel, a fragment of which is shown. The control rod is partly broken away.

Figure 2 is an elevation of Figure 1 from the right thereof, the control rod being shown in section.

Figure 3:
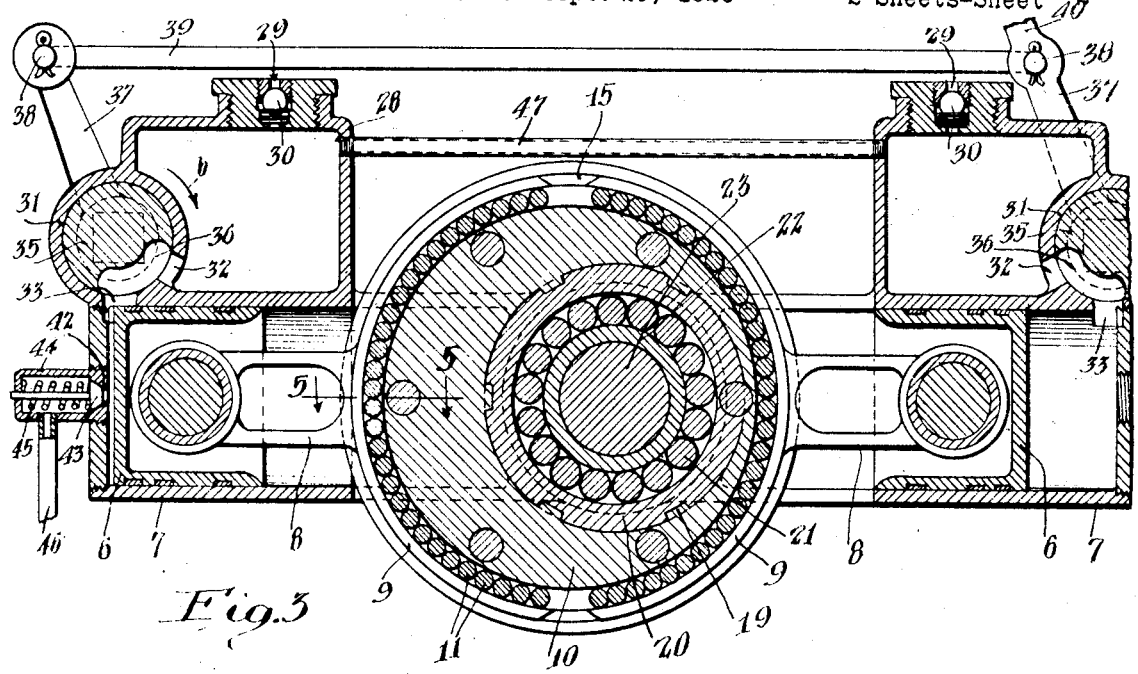
Figure 3 is an enlarged longitudinal section of the brake, mainly on the line indicated by 3—3, Figure 1, a portion being broken away at one end.
Figure 4:
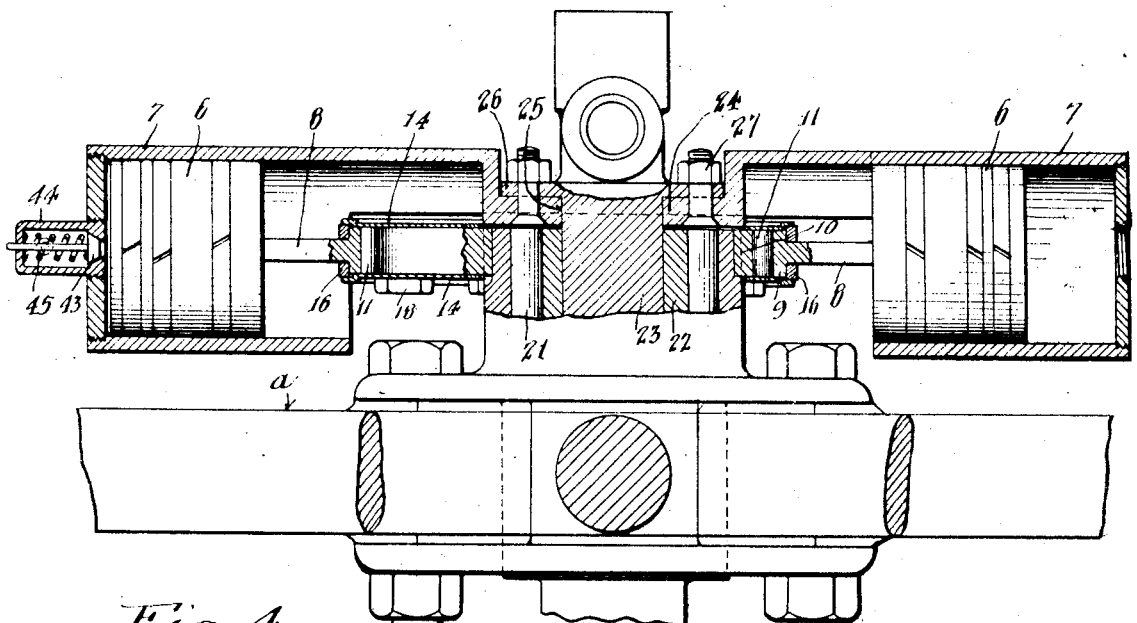
Figure 4 is an enlarged plan view similar to Figure 1, excepting that portions of the brake are shown in section.

One of the wheels of a motor vehicle is fragmentarily indicated at $a$ and said wheel, in this instance, is utilized for driving the moving elements of the brake, said moving elements being plungers 6 working in cylinders 7. For operably connecting the plungers with the wheel $a$, said plungers are connected by plunger rods 8 to an eccentric strap which, in this instance, is constructed of two segments 9. The body of the eccentric is indicated at 10 and between said body and the strap segments 9 are rollers 11. In this particular instance, the plunger rods 8 and strap segments 9 are integral.

The rollers 11 have reduced ends 12 which engage in bearing 13 in plates 14 placed on opposite sides of the eccentric body 10, said plates 14 constituting a cage to maintain the rollers 12 in proper position and to prevent escape of said rollers through the spaces 15 that are left between the ends of the strap segments 9.

Figure 5:
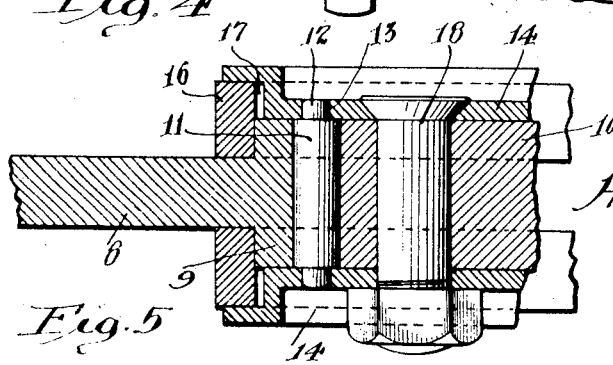
Figure 5 is an enlarged fragmental sectional detail on the plane indicated by 5—5, Figure 3.

Surrounding the strap segments 9 is a ring 16 constituting a housing for the eccentric. The opposite edges of the ring 16 project beyond the edges of the eccentric strap, as shown in Figure 5, and the plates 14 are provided with annular recesses 17 to receive said projecting edges. The plates 14 are held assembled with the eccentric body by bolts 18 which pass through the plates and through said body.

The eccentric body 10 is rotatably mounted in any suitable manner, in this instance, said body being keyed at 19 to the outer wheel bearing member or race 20 within which are the bearing rollers 21, and within the circle of rollers 21 is the inner bearing member or race 22 which is mounted upon the wheel spindle 23. The spindle 23 projects from the steering knuckle 24 since, in the particular instance shown, the brake is mounted on one of the dirigible wheels of the vehicle. It is to be understood that the brakes will be mounted in pairs either on the front wheels or on the rear wheels or on both the front and rear wheels.

The cylinders 7 are connected at their adjacent ends by a circular plate 24 that is provided with an orifice 25 through which the spindle 23 projects, and said spindle is provided with a flange 26 engaging the outer face of the plate 24. The plate 24 and flange 26 are secured together by bolts 27.

Mounted on the cylinders 7 are chambers 28 and said chambers are provided with ports 29 opening to the atmosphere and controlled by inwardly opening, outwardly closing ball check valves 30. Adjacent to the outer ends of the chambers 28 and cylinders 7 are valve chambers 31 which communicate with the chambers 28 through ports 32. The valve chambers 31 communicate with the cylinders 7 through ports 33.

In each of the valve chambers 31 is a valve 35 provided with an arcuate port 36, the valve being cylindrical and the port therein extending circumferentially in the face of the valve. The ports 32, 33 and 36 are relatively positioned so that when the valves 35 are turned into the positions shown in Figure 3, said ports will be in communication and, when the valves are turned in the direction of the arrow b, in Figure 3, the ports 32 will be closed by the valves.

The valves 35 may be operated by arms 37 and pivotally connected at 38 to said arms is a connecting rod 39. One of the arms 37 has an extension 40 which may itself be manually operated or it may be pivotally connected to a rod 41 that may extend to any suitable point for operation so as to effect operation of the valves.

In some instances, it may be desirable to provide at least one of the cylinders 7 with a port 42 controlled by an outwardly opening check valve 43. The port 42 opens into a spring chamber 44 in which is a spring 45 that tends to hold the valve 43 on its seat, and connected with the chamber 44 is a pipe 46 that may extend to a suitable compressed air container, not shown.

It is preferable to have the chambers 28 in communication with each other and, in this instance, such communication is established by a by-pass 47 connected at its opposite ends with said chambers.

The invention operates as follows. Assuming that the valves 35 are positioned to open the ports 32, 33 as in Figure 3, the brake will have no braking effect on the vehicle excepting that occasioned by friction of the moving parts and of the fluid as it is pumped in and out of the cylinders through the ports 32, 33, 36. On the in or suction stroke of either plunger, the tendency to create a partial vacuum in the associated chamber 28 will be overcome by reason of atmospheric air being drawn into said chamber through its port 29. On the out or compression stroke or either of the plungers, air will be displaced from the associated chamber 28 through the by-pass 47 into the other chamber. When the driver of the vehicle desires to effect a braking action upon said vehicle, he will operate the valves 35 into position to decrease the opening of the ports 33 and thus, as the plungers 6 operate on their compression stroke, they will tend to compress the fluid in the cylinders 7. The fluid that the plungers operate against may be air, in which event work will be performed in compressing said air; or said fluid may be a liquid, in which case work is performed in pumping said liquid through the lessened port opening 33. The resistance to operation of the plungers on their out stroke is imposed upon the eccentric body 10, thus retarding rotation of said body and the wheel which is driving said body.

Maximum braking effort is produced on the vehicle by operating the valves 35 into position to entirely close the ports 33.

When the valves 35 are operated into positions to decrease the port openings 33 to an extent that will produce an air pressure great enough to open the valve 43 against the pressure of the spring 45, the air compressed by operation of one of the plungers will pass through the port 42 into the pipe 46 to a suitable container, not shown.

I claim:

1. A fluid pressure brake comprising a cylinder, a plunger in the cylinder, a chamber provided with a port, an inwardly opening check valve controlling said port, valve means to control the flow of fluid between the cylinder and chamber, and means to operably connect the plunger with a vehicle wheel.

2. A fluid pressure brake comprising cylinders, plungers in the cylinders, chambers associated with the cylinders and provided with ports, inwardly opening check valves controlling said ports, a by-pass connecting the chambers, valve means to control the flow of fluid between each cylinder and its associated chamber, and means to operably connect the plungers with a vehicle wheel, said last mentioned means constructed and adapted to simultaneously move one of the plungers on its compression stroke and the other plunger on its suction stroke.

3. A fluid pressure brake comprising a bearing, an eccentric body mounted to turn on said bearing, an eccentric strap operable by the eccentric body, a support for the bearing, a cylinder connected with said support, a plunger in the cylinder connected with the eccentric strap, means including an inwardly opening check valve to induct air from the atmosphere into said cylinder, and means to prevent exhaust of air from the cylinder on the compression stroke of the plunger.

4. A fluid pressure brake comprising a wheel spindle, a vehicle wheel mounted thereon, a cylinder carried by the spindle having a port, a plunger in the cylinder, means including an inwardly opening check valve to induct air from the atmosphere into said cylinder, means to prevent exhaust of air by the air induction means on the compression stroke of the plunger, an outwardly opening spring closed check valve controlling the port, means to connect said port with a container for compressed air, and means to operably connect the plunger with the vehicle wheel.

5. The combination with a wheel spindle and a wheel rotatably mounted thereon, of a plate secured to said spindle, a cylinder connected with said plate, an eccentric body rotatably mounted on said spindle, an eccentric strap operable by the eccentric body, a plunger in the cylinder connected with the eccentric strap, means including an inwardly opening check valve to induct air from the atmosphere into said cylinder, and means to prevent exhaust of air by the air induction means on the compression stroke of the plunger.

6. A fluid pressure brake comprising a pair of cylinders fixed from rotation, a plunger in each cylinder, a chamber communicating with each cylinder and provided with a port, an inwardly opening check valve controlling said port, valve means to control the flow of fluid between the cylinders through the chamber, and means to operably connect the plungers with a rotary member.

Signed at Los Angeles, California, this 21st day of Sept., 1926.

HOWARD E. MARSH.